United States Patent [19]

Fruhauf et al.

[11] Patent Number: 4,924,212
[45] Date of Patent: May 8, 1990

[54] TEMPERATURE THRESHOLD DETECTION CIRCUIT

[75] Inventors: Serge Fruhauf, Peynier; Eric Mattera, Gardanne, both of France

[73] Assignee: SGS-Thomson Microelectronics S.A., Gentilly, France

[21] Appl. No.: 235,280

[22] Filed: Aug. 23, 1988

[30] Foreign Application Priority Data

Aug. 31, 1987 [FR] France ................... 87 12070

[51] Int. Cl.$^5$ ............................................. G08B 17/00
[52] U.S. Cl. ................................... 340/598; 307/310; 374/181
[58] Field of Search ....................... 340/598, 589, 588; 307/310, 491; 374/178, 181

[56] References Cited

U.S. PATENT DOCUMENTS

| | | | |
|---|---|---|---|
| 2,929,968 | 3/1960 | Henisch | 340/598 X |
| 3,491,596 | 1/1970 | Dean | 374/178 |
| 3,540,283 | 11/1970 | Dean | 374/164 |
| 4,121,461 | 10/1978 | Butler et al. | 307/310 X |
| 4,313,082 | 1/1982 | Neidorff | 307/310 X |
| 4,331,888 | 5/1982 | Yamauchi | 340/589 X |
| 4,448,549 | 5/1984 | Hashimoto et al. | 374/178 X |
| 4,549,818 | 10/1985 | Nishikubo et al. | 374/178 |
| 4,625,128 | 11/1986 | Boeckmann | 374/178 X |
| 4,730,228 | 3/1988 | Einzinger et al. | 307/310 X |
| 4,760,433 | 7/1988 | Young et al. | 307/310 X |

FOREIGN PATENT DOCUMENTS

| | | |
|---|---|---|
| 1141805 | 12/1962 | Fed. Rep. of Germany . |
| 2519335 | 10/1976 | Fed. Rep. of Germany . |
| 1562112 | 4/1969 | France . |
| 2096771 | 10/1982 | United Kingdom . |

Primary Examiner—Reinhard J. Eisenzopf
Assistant Examiner—Robert W. Mueller
Attorney, Agent, or Firm—Roland Plottel

[57] ABSTRACT

A threshold temperature detection is made by measuring the reverse saturation current of a transistor subjected to the temperature to be measured. It is shown that, for temperatures close to the ambient temperature, the sensitivity of this detector is very high. Furthermore, in making a circuit that measures the relative variations of the reverse saturation current, a temperature detector is made which is independent of variations in characteristics resulting from manufacturng tolerances for integrated circuits. This circuit is particularly designed to be implanted in the same substrate as a memory circuit of the type with memory cells, provided with floating gate transistors.

6 Claims, 2 Drawing Sheets

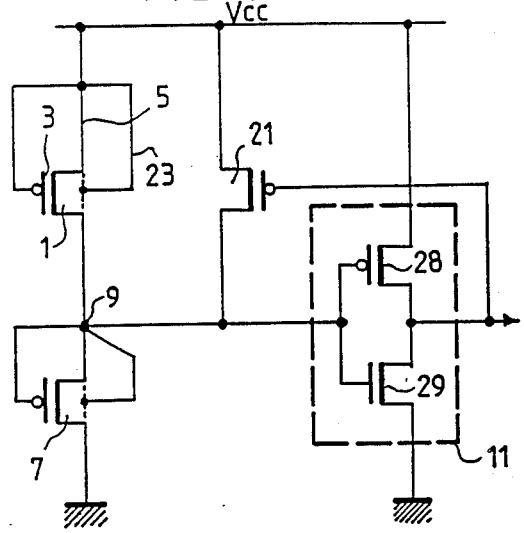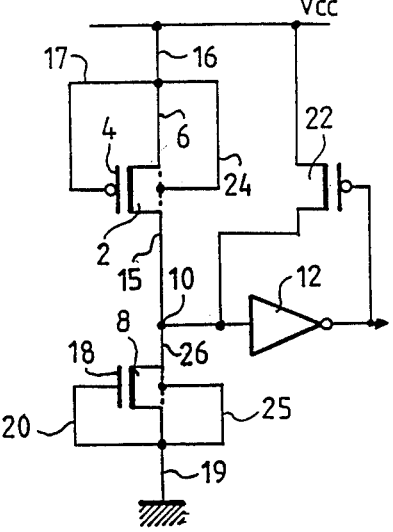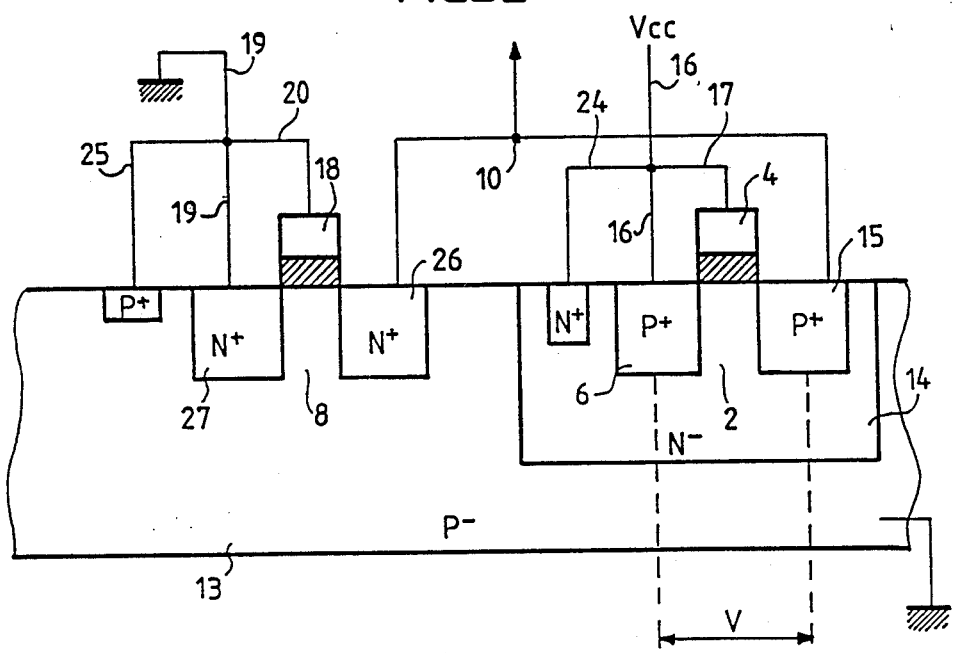

FIG_3
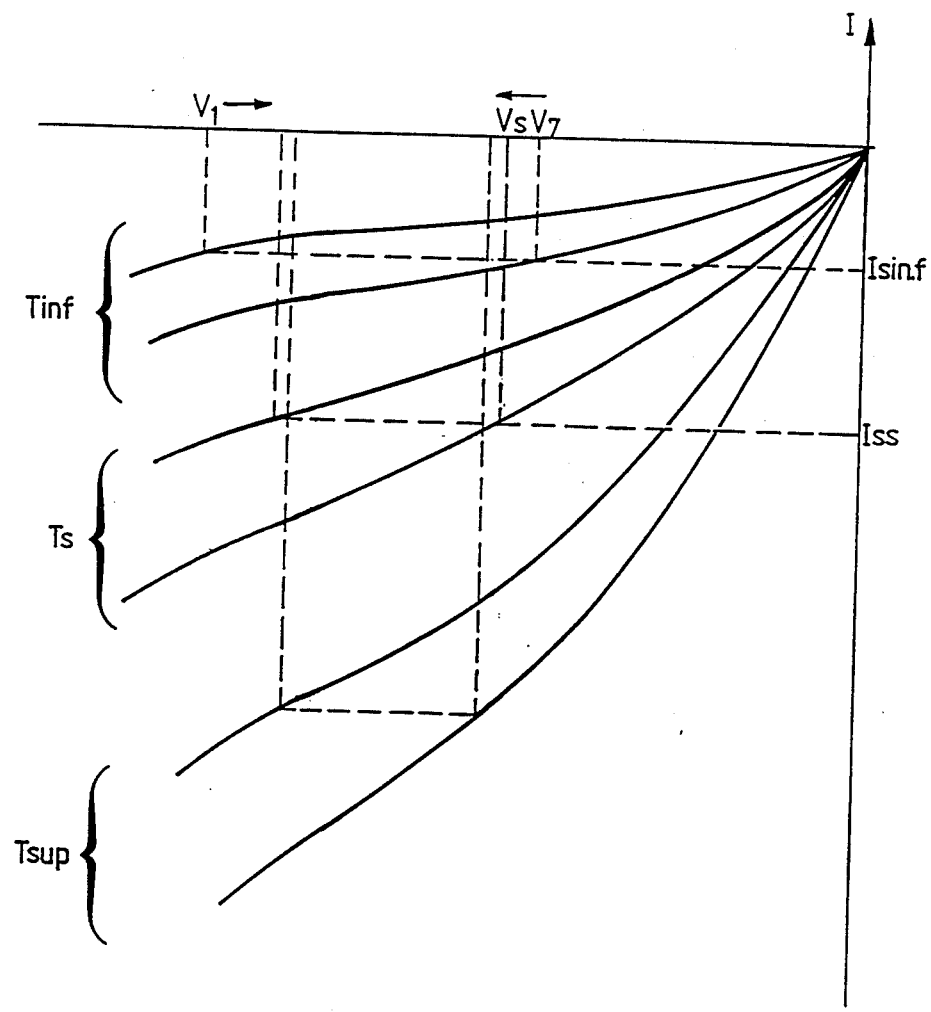

TEMPERATURE THRESHOLD DETECTION CIRCUIT

BACKGROUND OF THE INVENTION

1. Field of the Invention

An object of the invention is a temperature threshold detection circuit which can be used in all fields where temperature has to be monitored. However, the invention can be more especially used in the field of integrated circuits and, therein, in that of memories.

2. Description of the Prior Art

It is known that using electronic integrated circuits cause them to be heated up through the passage of different current pulses which excite them, especially during programming operations. For, especially with non-volatile memories provided with memory cells (of the EPROM or EEPROM type) with floating gate transistors, the current or voltage pulses should be greater to force the electrical charges to migrate into the floating gates of the transistors of the memory cells at the instant when these cells are programmed. If the programming rate is too high, it may result in an irreversible deterioration of the integrated circuit. To overcome this drawback, there is a known way to limit the programming rate according to the cooling capacity of the integrated circuit to be programmed. This drawback, however, limits the use of the memories for which the memory cell is provided with floating gate transistors, such as the random access memory of a microprocessor.

Furthermore, it can be assumed that dishonest individuals will try and use the programming aberrations that might result from artificial external heating of an integrated circuit of this type before it is programmed. These dishonest individuals might also be tempted, during this programming operation, to keep these circuits at temperatures which are below the irreversible destruction threshold but above a normal operating limit threshold of the circuit. During a subsequent cooling, the content of the information stored in a circuit of this type could be different from the information introduced therein during the programming operation. This different content could enable the use of a memory card, fraudulently modified in this way, for dishonest purposes. An operation in reverse can also be envisaged. If comprehensively heated, a card provided with a regularly programmed memory could temporarily have a modified content of information and would there would be the risk that this would enable operations to which the card should normally prevent access. This latter type of fraud would be all the more subtle as it is incapable of being detected. For, when checked in the cold state, the card would once again appear to conform to requirements.

There are known temperature detectors based on integrated circuits essentially comprising a directly biased MOS type transistor with a conduction threshold known to vary with the temperature. Typically, for silicon transistors, this conduction threshold varies between 0.3 volts and 0.5 volts for a variation in temperature of about 100° C. at the habitual temperatures of use. However, this temperature detector has the drawback of not being very sensitive: a very low voltage variation corresponds to a wide range in temperature. Furthermore, while this voltage variation does not depend on the geometry of the transistor made, it depends to a great extent on the concentrations of impurities effectively implanted in the source and drain regions and in the transistor pads thus made to act as temperature detectors. For, owing to natural variations in manufacturing conditions, these temperature detectors become unreliable in addition to lacking sensitivity. Their detection threshold varies excessively from one detector to another. In practice, these approaches are rejected and replaced by precautionary set values tending to restrict the use of integrated circuits of this type, thus reducing their use as random access memories: this, of course, has no effect on the intentions of dishonest persons. An object of this invention is to overcome these drawbacks by proposing the use of another physical phenomenon. For, it has been realized that the saturation current of a reverse biased transistor changes in an appreciable manner as a function of the temperature. It can even be shown that this current can get doubled while the temperature varies by only a few degrees C. Furthermore, in an improved embodiment where two transistors are used mounted in series and both reverse biased, it can be shown that the calibrated thresholds of detection are less sensitive to manufacturing variations and are also less sensitive to the conditions of use, i.e. when the supply voltage diverges from a rated value Vcc.

SUMMARY OF THE INVENTION

An object of the invention, therefore, is a temperature threshold detection circuit comprising at least one transistor which is reverse biased by an electrical supply circuit and means to measure the inverse saturation current which flows through this transistor.

BRIEF DESCRIPTION OF THE DRAWINGS

The invention will be better understood from the following description and the accompanying figures. These figures are given solely by way of indication and in no way restrict the scope of the invention. Of these figures:

FIGS. 1a and 1b show preferred embodiments of temperature threshold detectors according to the invention;

FIG. 2 is a schematic section of an implantation of the detector of FIG. 1b in the semi-conducting substrate of an integrated circuit;

FIG. 3 gives curves showing the development of characteristic voltages in the detectors as a function of temperature.

DESCRIPTION OF PREFERRED EMBODIMENTS

FIGS. 1a and 1B show temperature threshold detectors according to the invention. These detectors comprise at least one transistor, 1 and 2 respectively, reverse biased in electrical supply between Vcc and the ground. In the example shown, the transistors are P channel transistors and the voltage Vcc is positive. In the figures, the P channel transistors are schematically differentiated from the N channel transistors by a small circle on their gates. The transistors 1 and 2 are reverse mounted because, being P channel transistors, their gates, 3 and 4, respectively are connected to one and the same potential as their sources, 5 and 6. respectively. The temperature threshold detector of the invention also has means to measure the reverse saturation current that flows through the transistors 1 and 2. In a preferred embodiment, these measuring means comprise a second transistor, 7 and 8 respectively, series mounted with the first transistor, 1 and 2 respectively, and also reverse biased by the electrical power supply. In FIG. 1a the transistor 7 is also a P channel transistor: its gate is connected to its source. In FIG. 1b the transistor 8 is an N channel transistor: its gate is connected to its source, namely to the ground. This second transistor also acts as a resistor of which the voltage available at the terminals depends on the saturation current which flows through the first threshold temperature detection transistor.

By connecting the mid-point, 9 and 10 respectively, of these assemblies to inverters 11 and 12, these inverters can be made to flip over when the voltage available at these mid-points exceeds a pre-determined threshold. The means for measuring the reverse saturation current may, of course, be different. But the approach thus presented has the advantage of giving an "all-or-nothing" response for a pre-determined temperature threshold. This binary response can then be used to constitute an alarm or, if the detector is integrated into the substrate of an integrated circuit, to invalidate the operation of this integrated circuit, the temperature of which would exceed the threshold in question. The circuit would then become momentarily unusable, in programming or reading, thus preventing fraud. Furthermore, in the event of excessively fast programming, the execution of the programme can be validated by the signal available at the output of the inverters 11 and 12. It is thus ensured that it will always be possible to use the maximum programming speed. The so-called EE-PROM can then be used as random acces memories.

The physical phenomenon applied can be explained as follows. If Is designates the reverse saturation current of a transistor, it is known that Is is the saturation current of the source-channel junction of this transistor and that it varies with temperature. This this current can be written:

$$Is = q \cdot A \, (Dp \cdot Pno/Lp - Dn \cdot Npo/Ln)$$

In this formula q represents the charge of the electron; A represents the source-channel junction area. This area depends on the geometry chosen to make the transistor. The constants contained in the brackets represent the characteristics of diffusion of the impurities in the source, drain and channel regions of the transistors sensitive to temperature. These constants depend on the manufacturing methods for these transistors. The constant Dp represents the diffusion constant of the holes in an N type semi-conductor. The constant Lp represents the diffusion length of the holes in an N type semi-conductor. The constant Pno represents the concentration, at equilibrium, of the minority carriers, namely that of the holes, in an N type semi-conductor. Reciprocally, the constant Dn represents the diffusion constant of the electrons in a P type semi-conductor. The constant Ln represents the diffusion length of the electrons in a P type semi-conductor. And the constant Npo represents the concentration, at equilibrium, of the minority carriers in a P type semi-conductor.

It may be taken that one of the two terms contained in the brackets is preponderant with respect to the other. For, one of the regions of the transistors, the source region, is appreciably more doped, with a CMOS type transistor, than the conduction channel zone. In these circumstances, the current Is can be written:

$$Is = q \cdot A \cdot D \cdot Ni^2 / L \cdot N$$

In this expression, D corresponds to the predominant diffusion constant, L corresponds to the corresponding diffusion length, N represents the concentration of impurities and Ni represents the intrinsic concentration of carriers. Now, it is known that the intrinsic carrier concentration can be written:

$$Ni^2 = Ao \, T^3 \exp(-Ego/kT)$$

In this expression, T represents the temperature, Ego represents the bandgap at 0° K, Ao represents a constant that is independent of the temperature and k represents the Boltzmann's constant. The result of this is that Is is proportionate to the cube of the temperature T and to the exponential contained in the brackets. If we derive the expression of Is as a function of temperature to measure the sensitivity of the saturation current to the variation in temperature, and if the derivative is expressed as a function of the saturation current Is itself, the following particularly valuable expression is obtained:

$$dIs/dT = Is \, ((3/T + (Ego/k \cdot T^2)))$$

In a digital application where T is equal to 300° K, the coefficient in the double brackets is substantially equal 0.165. This means that, for a variation in temperature of about 6° C. (6×0.165=0.99), the saturation current is doubled. It can be immediately seen that the sensitivity of the temperature detector thus made is high. If, in addition, we take the precaution of measuring the relative variations of the saturation current Is (i.e. as compared with itself), a temperature detector is made possessing reliability independent of the concentrations actually laid down in order to make the transistors. For, the last expression of the relative variations of the current Is shows that the constants related to the manufacturing method have finally disappeared from the expression. The result of this is that the determining of the detection threshold will be due to only the detection circuit itself and not to the detector proper.

In the particular application considered, the temperature detector is integrated into the same integrated circuit as the one which it is supposed to protect. FIG. 2 shows a layout diagram corresponding to FIG. 1b in order to give a clear picture of the connection alternatives made in this case. However, as shall be seen further below, it is the assembly of FIG. 1a that is preferred: it is more sensitive. FIG. 2, with reference to FIG. 1b, shows a substrate 13 in which an integrated circuit to be protected is made. The substrate 13, in a P-doped example, has a pad 14 to take the transistor 2. The pad 14 is N- doped with a concentration of impurities greater than the concentration of P- impurities of the substrate. The transistor 2 has a source region 6 and a drain region 15. The region 6 and 15 are P+doped with concentrations greater than the concentration of impurities implanted in the pad 14. The transistor 2 is naturally turned off by the common connection 16-17 of its source 6 and its gate 4 to the supply potential Vcc. In the example shown, the substrate 13 is connected to the ground. The drain 15 of the P channel transistor 2 is connected to the drain 26 of the N channel transistor 8. The source 27 of the transistor 8 is connected to the gate 18 of this transistor 8 and to the ground by a connection 19-20.

Regardless of the assembly, the transistors thus placed in series and reverse biased, possess the essential feature of having different sizes. Since they have different sizes, the reverse current that flows through them is the saturation current imposed for the smallest of these transistors. For, as they are in series, the current which will flow through the other transistor is smaller than the saturation current proper to this other transistor. FIG. 3 shows the development of the comparative characteristics of voltages and reverse currents in the transistors 1 and 7 (FIG. 1a) as a function of the temperature. At a temperature Tinf, below the triggering threshold Ts, one and the same reverse saturation current Isinf flows through both transistors. The small transistor, for example the transistor 1, causes a voltage drop V1 while the other transistor, the transistor 7, causes a voltage drop V7. The voltage drops are such that V1+V7=Vcc. The voltage at the mid-point gets established accordingly. When the temperature rises and when, finally, the reverse saturation current increases, the equivalent resistance, in reverse, of the small transistor drops. The resistance of the large transistor drops too. This transistor is also subjected to heating and the characteristic curves move downwards. But the variation in this latter resistance is smaller. The result of this is that the voltage V7 increases while V1 drops. For Is = Iss, the predefined voltage threshold Vs is reached by the voltage V7. The mid-point of the divider bridge formed by the two transistors in series is thus located at a potential which changes with the temperature owing to the greater relative drop of the equivalent resistance in reverse of the small transistor. The value of this potential is then used to trigger a threshold comparator.

In practice, the threshold comparator may be an inverter with its flip-over threshold fixed close to a value substantially equal to half the supply voltage Vcc by the widths and lengths of the transistors 28 and 29 forming this inverter. Since the dynamic range of operation of this detector, in an application to an EPROM memory, is not great, the flip-over speed of the inverter is not of critical importance in it. And, at the lower limit of the temperature threshold, non-communication may be accepted. However, should it prove to be necessary to make a fast and comfortable detection, the comparator can be made with a bi-stable inverter. The bi-stable nature of the device can be obtained by adding a P channel transistor, 21 or 22, between the input of the inverter and the positive pole of the supply, the gate of said transistor 21 or 22 being connected to the output of the inverter. When the temperature is low, the temperature detecting transistor has high resistance, and the voltage of the mid-point 9 or 10 is low. Thus, the output of the inverter 11 is at Vcc and the transistors 21 or 22 are naturally off. On the contrary, when the temperature threshold has been exceeded, the internal resistance of the transistors 1 or 2 has greatly dropped and the voltage of the mid-points 9 or 10 has risen. Thus, the bi-stable circuits 11–21 or 12–22 flip over. The inverter 11 is shown in detail. In a known way, it has a P channel transistor 28 in series with an N channel transistor 29. The gates of these transistors are connected and act as input terminals, while the mid-point of the transistors acts as an output.

In a preferred way, in the invention, the pads 14 of the P channel transistors such as 1 or 2 are connected to one and the same potential as the sources 5 and 6 respectively of these transistors. For if the source, gate and pad of one and the same P channel transistor are not at one and the same potential, the reverse saturation current which should normally flow between source, channel and drain may also flow between source, channel and substrate. For, the substrate, which is generally biased at the ground, can collect the minority carriers. By making a pad connector such as 23 or 24, the pad 14 is carried to a high potential. If the source and the pad are at the same potential, no part of the saturation current can flow between these two connectors. By reciprocity, for the transistor 8, the substrate 13 is connected to the ground at the same time as the source 17 by a connection 25.

It is noted, however, that while the assembly of FIG. 1a is possible by making two separate pads for the two P channel transistors 1 and 7 (the pad connector of the P channel transistor pad 7 being then carried to the potential of the mid-point 9), this approach cannot be transposed to an assembly with two series-mounted N channel transistors made in one and the same P type substrate. For, it is not possible to carry the P type substrate firstly to the potential of the ground, and secondly, to the potential of the mid-point of the assembly. Hence, with a P type substrate, it is possible to make a threshold detecting assembly comprising two transistors (of unequal sizes), said two transistors being a P channel transistor and a P channel transistor or a P channel transistor and an N channel transistor, but not an N channel transistor and an N channel transistor.

- If W is the width of a transistor, and if V is the length of this transistor measured (FIG. 2) in the plane of the integrated circuit perpendicularly to the width W, it is can be ascertained (taking for the transistor 1, a ratio W/V=5/5 and taking for the transistor 7 a ratio W/V=5/6) that the temperature detection threshold of a bi-stable type inverter, set to flip over at Vcc/2, is located between 87° C. and 96° C. regardless of the variation in the Vcc supply between 4.5 volts and 5.5 volts and regardless of the worst cases of variation of the concentration of N and P impurities to make the transistors. In view of the fact that an integrated circuit of this type has a limit temperature of operation of about 100°, a detector of this type can be used to invalidate the use of these circuits or, at least, to form an alarm signal.

The imbalance of the bridge of transistors, caused by the difference in their size, can be replaced by an imbalance in concentration. The curves of FIG. 3 would thereby be modified, but a similar operation can be obtained. In this case, however, the independence of the detection threshold with respect to the stages of the manufacturing method is less properly ensured.

What is claimed is:

1. A temperature threshold detection circuit comprising at least one transistor, reverse biased by an electrical supply circuit, and means for measuring the reverse saturation current which flows through this transistor, wherein the measuring means comprise a second transistor in series with the first transistor and reverse biased by the supply, having a size different from that of the first transistor, and a threshold comparator connected to the mid-point of these two transistors.

2. A circuit according to claim 1 integrated into the substrate of an integrated circuit to provide for its thermal monitoring.

3. A circuit according to claim 2 wherein the two channels have identical conduction channels.

4. A circuit according to claim 2 wherein one of the transistors is a P channel transistor, made in a P dope substrate and contained in a pad which is electrically connected to the source potential of this transistor.

5. A circuit according to claim 1 wherein the two channels have identical conduction channels.

6. A circuit according to claim 1 wherein one of the transistors is a P channel transistor, made in a P doped substrate and contained in a pad which is electrically connected to the source potential of this transistor.

* * * * *